Jan. 30, 1968   W. E. SEVRENCE   3,366,405
ANCHORAGE DEVICE

Filed July 30, 1964   3 Sheets-Sheet 1

INVENTOR
Warren E. Sevrence
BY
*Ronaie Edmonds Morton Taylor & Adams*
ATTORNEYS

Jan. 30, 1968   W. E. SEVRENCE   3,366,405
ANCHORAGE DEVICE
Filed July 30, 1964   3 Sheets-Sheet 2
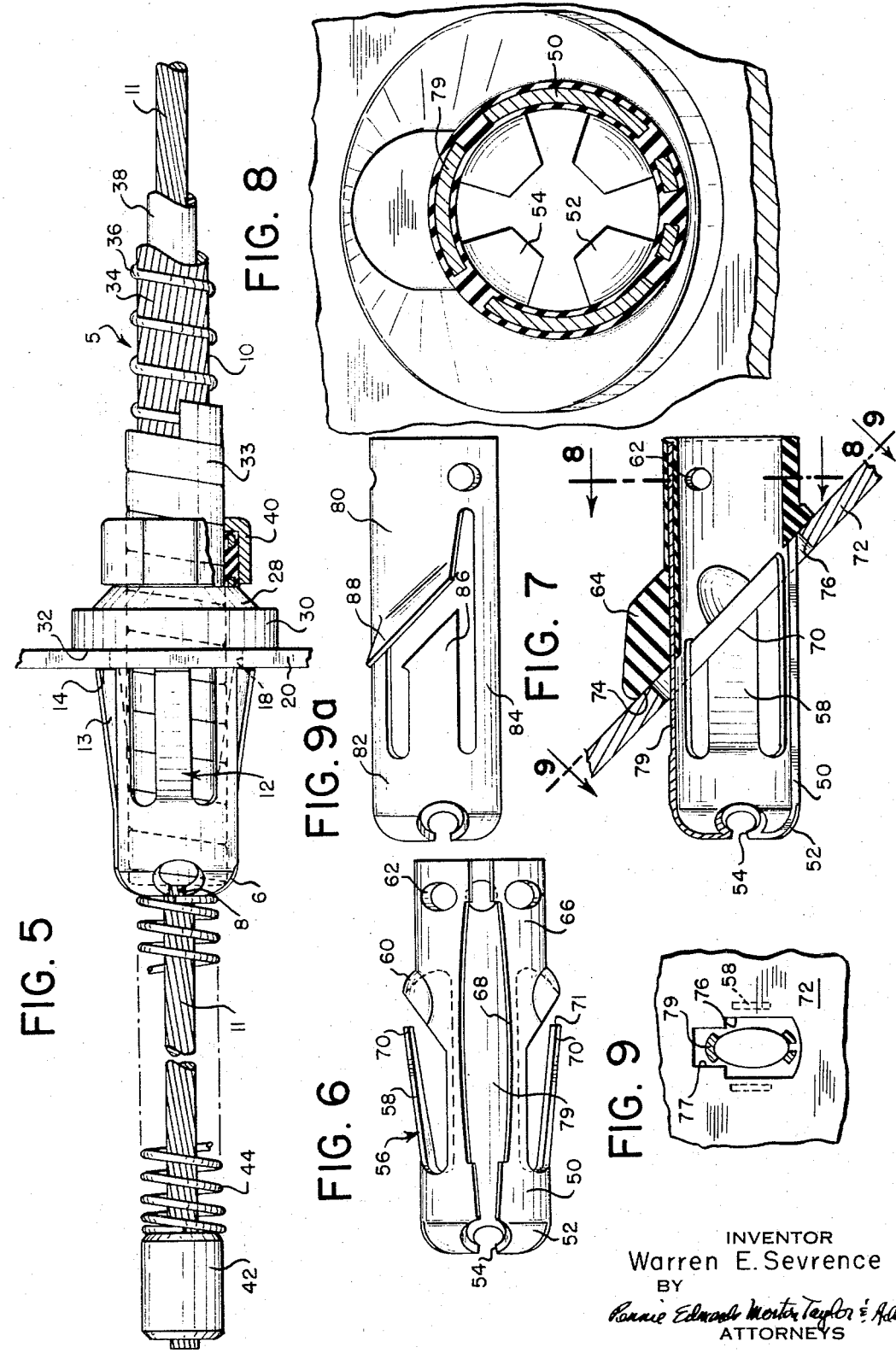
INVENTOR
Warren E. Sevrence
BY
Ronnie Edwards Morton Taylor & Adams
ATTORNEYS Jan. 30, 1968
W. E. SEVRENCE
3,366,405
ANCHORAGE DEVICE
Filed July 30, 1964
3 Sheets-Sheet 3
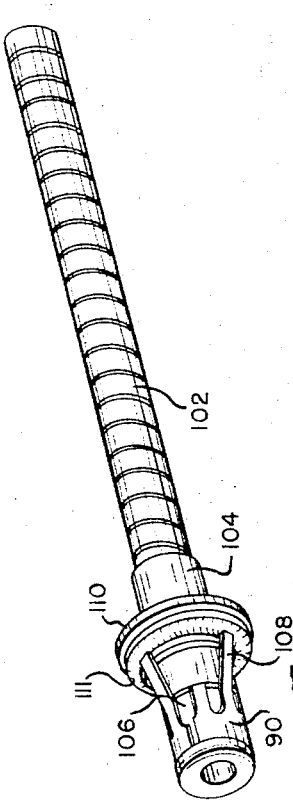
FIG. 10
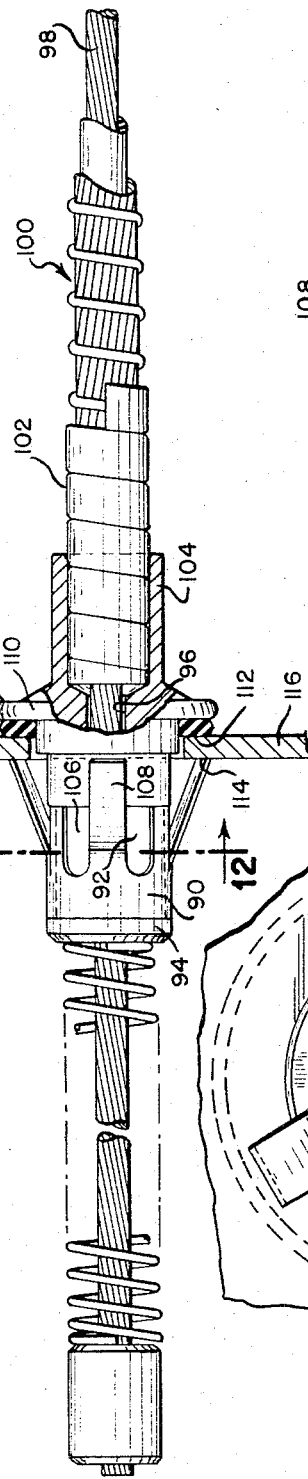
FIG. 11
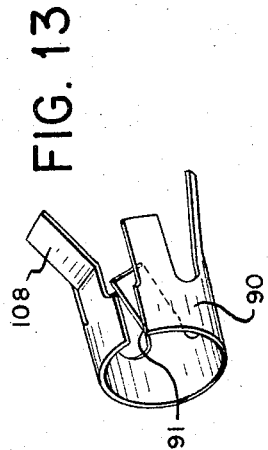
FIG. 13
FIG. 12
INVENTOR
Warren E. Sevrence
BY
*Bonnie Edwards Morton Taylor & Adams*
ATTORNEYS United States Patent Office 3,366,405
Patented Jan. 30, 1968

3,366,405
ANCHORAGE DEVICE
Warren E. Sevrence, Adrian, Mich., assignor to American Chain & Cable Company, Inc., New York, N.Y., a corporation of New York
Filed July 30, 1964, Ser. No. 386,266
4 Claims. (Cl. 287—20)

This invention relates to an anchorage device for securing a cable assembly to a housing wall. It is more particularly directed to a self-locking anchorage device for use with a control cable assembly, the control cable assembly having a casing and a core element axially translatable through the casing. The self-locking anchorage device is formed with an anchor member having diverging prongs which in cooperation with a resilient seating collar secure the device to a housing wall through which the anchorage device is inserted. The invention has special application to flexible cables, such as automotive emergency brake cables of the tension loaded cable conduit type, and to securing such cable conduit assemblies in axially immovable and watertight relationship to a brake housing.

Since the present invention has particular application to automotive brakes it will be described in that context although it is, of course, understood that the invention has application in other areas. Automotive emergency brakes are mechanically actuated by a J hook or similar devices to expand the brake shoes against the brake drum. The J hook is actuated by a control cable assembly comprising a cable casing and a core element slidable axially within the casing between the attachment at the end of the J hook and the operating means controlled by the driver. When the driver operates the brake, tension is applied to the cable core element which causes displacement of the brake shoes against the drum via the linkage with the J hook.

The brake assembly is contained within a brake housing which protects the parts and acts as a mounting member for various elements of the brake. Necessarily, then, to provide the linkage between the operator and the brakes, the brake cable must run through an opening in the brake housing. This opening is a potential avenue through which foreign matter may enter to foul the brake assembly and is a difficult point at which to secure a cable conduit assembly.

The invention is directed to anchoring a brake cable conduit assembly in an opening of a brake housing in such a manner that the cable casing is axially immovable yet permits free movement of the core to actuate the brake. Further, the anchorage device is self-locking, easily assembled and has a seating member which co-operates with an anchor member to provide constant forces urging the members into tight seating relationship with each other and with the housing wall. The seating member also provides a watertight seal to prevent water and other foreign substances such as dirt, oil and the like from entering the interior of the brake housing. The anchorage device of the invention is inexpensive, of simple construction and permits rapid assembly upon a brake housing wall.

Broadly, the invention is for an anchorage device for securing a control cable conduit assembly of the type having a casing and an axially translatable core member therein, in an opening in a housing wall. The anchorage device comprises a substantially tubular main body portion adapted to receive the cable conduit assembly. A crown portion at one end of the main body portion has an opening therein to permit the passage of the cable core only. A plurality of prongs diverge from the wall of the main body toward its other end. An annular seating member is located at said other end and is provided with a resilient seating collar. The normal distance between the seating face of the seating collar and the ends of the prongs is less than the thickness of the housing wall. Means are also provided for securing the anchorage device to the cable casing.

A clear understanding of the invention will be had by referring to the drawings of preferred embodiments of the device, wherein FIG. 1 is a side elevation of the anchorage device illustrating the anchor member without the seating member;

FIG. 5 is a side elevation partly broken away of the anchorage device in combination with a control cable conduit assembly mounted in operative position upon a housing wall;

FIG. 6 is a side elevation of an embodiment of the anchor member adapted to be mounted at an angle on the housing wall;

FIG. 7 is a longitudinal section of the embodiment of FIG. 6 with the seating member integrally molded thereon and in position on a housing wall;

FIG. 8 is a section along line 8—8 of FIG. 7;

FIG. 9 is a fragmentary section showing the opening in the housing wall and taken along line 9—9 of FIG. 7;

FIG. 9a is a side elevation of an embodiment of the anchor member having a modified nib design;

FIG. 10 is a perspective of another embodiment of the anchorage device as affixed to a control cable conduit assembly;

FIG. 11 is a side elevation partly broken away of the embodiment of FIG. 10 shown mounted on a housing wall;

FIG. 12 is a fragmentary section taken along line 12—12 of FIG. 11; and

FIG. 13 is a perspective of the anchor member of the embodiment shown in FIG. 10.

Figure 1:
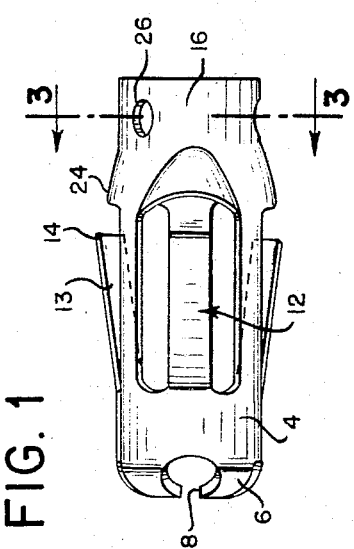
Figure 2:
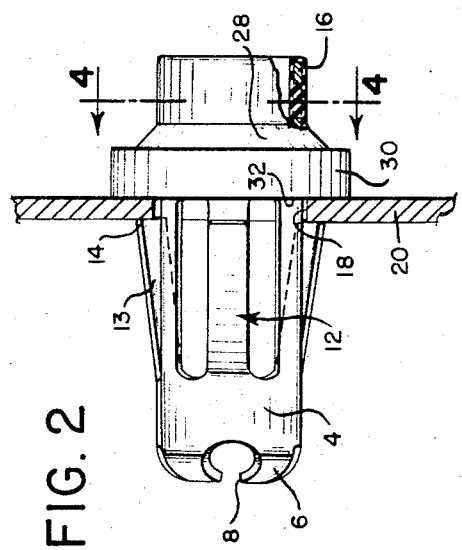
FIG. 2 is a side elevation partly broken away of the anchor member with the seating member integrally molded thereon in position on a housing wall.

Referring to FIGS. 1 to 5, the anchorage device has a substantially tubular main body portion 4 made of high carbon steel and is adapted to be fitted over the end of a control cable conduit assembly 5. A crown portion 6 partially closes one end of the tubular main body portion 4. The crown portion 6 is preferably formed by crimping a serrated end in such a manner that an opening 8 is provided in the crown portion. The crown portion 6 thus formed seats over the end of the control cable conduit assembly 5 and restricts the passage of the cable casing 10 of the cable while permitting the passage of a core 11 thereof (see FIG. 3).

An anchor member or portion generally designed as 12 is formed with a plurality of prongs 13. In the embodiment of FIGS. 1 to 5 the prongs 13 are integral with the main body portion 4. The prongs 13 are portions of the wall of the main body portion 4 which portions have been bent away from the sides so that their ends 14 are radially outward of the main body portion. The prongs 13 are rooted near the crown 6 and diverge toward a seating end 16 of the main body portion 4.

Figure 3:
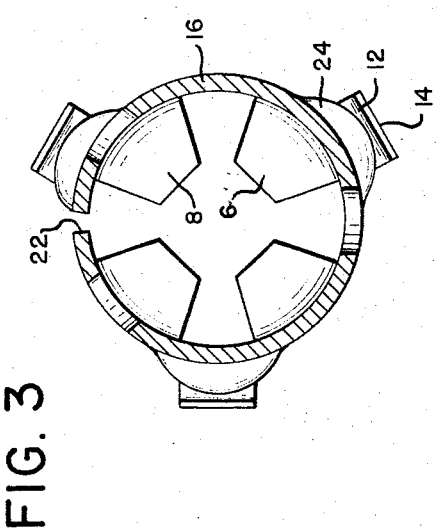
FIG. 3 is a section along line 3—3 of FIG. 1.
Figure 4:
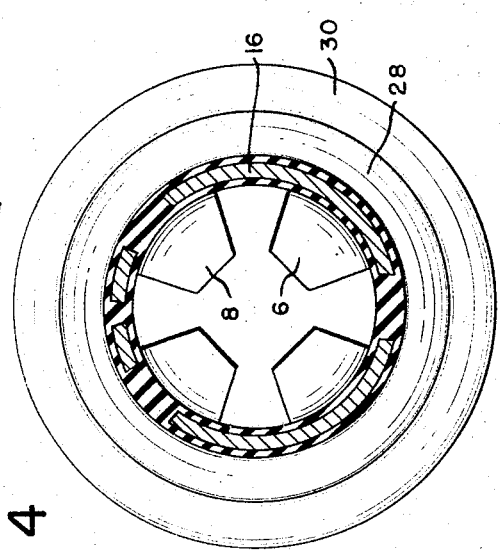
FIG. 4 is a section along line 4—4 of FIG. 2.

The prongs 13, while made of high carbon steel, have sufficient resiliency to permit their ends 14 being biased radially inward when the anchor member 12 is passed through an opening 18 in a housing wall 20. The resiliency of the anchor member 12 is also generally enhanced by a longitudinal split 22 in the main body portion (FIG. 3).

The seating end 16 is provided with nibs 24, which extend outwardly of the main body portion 4 and which cooperate with openings 26 to secure a resilient seating member 28 upon the seating end. The seating member 28 is preferably made of a synthetic resin material such as polyvinylchloride which is integrally molded upon the seating end 16. The seating member 28 has an annular collar portion 30 with a radial dimension greater than that of the opening 18 in the housing wall.

A seating face 32 of the seating member 30 is spaced from the ends 14 of the prongs 13 so that in the mounted position the housing wall 20 may be fitted therebetween. However, the normal dimension (i.e., the dimension prior to mounting) between the seating face 32 and the prong ends 14 is less than the corresponding thickness of the housing wall 20. These dimensional differences are important to the self-locking characteristics of the device.

In mounting the anchorage device upon the housing wall 20, the crown 6 is inserted through the opening 18. As the device passes through the opening (to the left in FIG. 2) the prongs 12 are compressed inward and, of course, cannot regain their normal diverging positions until they have completely passed through the opening 18. Because of the dimensional differences in the thickness of the wall 20 and the normal distance between the prong ends 14 and the seating face 32, the seating collar 30 must be compressively deformed before the passage of the prongs 13 is complete. Upon passing through the opening 18 the prongs 13 snap into their normal positions and being axially noncompressible prevent movement of the device to the right. This compressive deflection has two primary end results—(1) a watertight joint and (2) a secure joint which resists relative movement thus precluding abrasive wear of the components.

Referring to FIG. 5 the complete assembly is there shown including the anchorage device, the control cable and the housing wall. The control cable conduit assembly 5 is fitted at its end with a flat wire ferrule 33. The cable casing 10 formed of a plurality of stranded wires 34, a binder wire 36 and a plastic tubular liner 38, has its one end abutting the interior of the crown portion 6. The cable core 11 which is slidable within the liner 38 extends entirely through the cable casing and through the opening 8 in crown 6. The anchorage device is secured to the ferrule 33 of the cable casing 10 by a stamped cap 40 which is compressed on the casing upon the seating end 16. Thus, the anchorage device is fixed to the cable casing 10 and is immovable with respect to it.

The cable assembly further has a button 42 secured to the operating end of the core 11. It is this button 42 which is in operative engagement with the J hook of the brake assembly. A compression spring 44 is located concentrically about the core 11 between the button 42 and the crown 6. The compression spring 44 functions to bias the core in a direction moving the J hook and brake shoe away from their engaging positions. When tension is applied to the cable core 11 by an operator acting at the opposite end of the cable, the spring 44 is compressed and the brake shoes are moved into engagement with the brake drum.

The foregoing description of the operation of the brakes and the cable assembly illustrates the importance of having the cable casing 10 fixed against axial movement. When the casing 10 is so fixed an established reference point is provided which permits the cable to be precisely operated. Restricting the cable casing against axial movement is important because the resultant compressive reaction forces by the casing when the core is loaded in tension tends to cause relative axial movement between the casing and the core resulting in lost motion in the system.

FIG. 5 illustrates how a fixed reference point is established. The end of the casing 10 abuts the interior of crown 6 of the anchorage device and the anchorage device in turn is fixed to the cable casing 10 by the swaged cap 40. The anchorage device is itself fixed to the housing wall 20 by reason of the cooperating action of the anchor member 12 and the seating member 28 as fully described above.

An important aspect of the invention is the sealing function of the seating collar 30. The elastic properties which provide the reaction forces in securely seating the anchorage device to the wall 20 also serve to provide a watertight seal around the opening 18. The tight fit and the deformation of the seating face 32 at the periphery of the opening 18 seals the brake assembly against water, dirt and oil entering from the outside, the right side in FIG. 5.

Referring to FIGS. 6 to 9, another embodiment of the anchorage device is shown, which embodiment includes counterparts of all of the elements of the device of FIGS. 1 to 5. The device has a substantially tubular main body portion 50 with a crown portion 52 having an opening 54 therein. An anchor member or portion 56 has diverging prongs 58. Nibs 60 and openings 62 cooperate to secure an integrally molded elastomeric seating member 64 to a seating end 66. The main body portion 50 has a longitudinal split 68.

The principal difference between the embodiment of FIGS. 6 to 9 over the embodiment of FIGS. 1 to 5 is in the configuration and function of the prongs 58 and the seating member 64. In FIGS. 1 to 5 the end 14 is approximately at a right angle to the longitudinal axis of the anchorage device. As seen in FIG. 7 the prong end 70 is at an included angle of approximately 45° with respect to the longitudinal axis. The seating face 74 of the seating member 64 is similarly angled with respect to the longitudinal axis of the anchorage device and lies in a plane substantially parallel to that of a contact surface 71 of the end 70. When the anchorage device is in mounted position upon the housing wall 72, the longitudinal axis of the device is thus diagonal with respect to the plane of the housing wall. The thickness of the seating member 64 varies to give it greater structural rigidity at the upper portion as seen in FIG. 7.

It is also noted in this embodiment that there are only two prongs and that they are located upon opposite sides of the main body portion 50.

The particular advantage of this embodiment is that rotational as well as axial movement of the device is prevented. The reason is that a rotational force would bring additional pressure to bear between one or the other of the prong ends 70 and the housing wall 72, tending to tighten the device to the wall. For example, in FIG. 7, were a rotational force applied tending to move the prong 58 upwardly, the resultant force would tend to move the main body portion 50 to the left thus bringing additional pressure to bear upon the seating face 74. No matter what the direction of the rotational force, one or the other of the oppositely spaced prongs 58 will tend to move upward resulting in axial force to the left.

Rotational movement is further prohibited by the configuration of an opening 76 in the wall 72 for receiving the anchorage device. FIG. 9 illustrates a slot 77 which receives a spine portion 79 of the tubular main body portion 50 of the device and cooperates with the spine portion to prevent rotation.

Referring to FIG. 9a, a modification of the anchorage device of FIG. 6 is shown. A main body portion 80 is shown with a crown portion 82 and an anchor member or portion 84 having diverging prongs 86, all formed in a manner like the comparable portions of the device of FIG. 6. The embodiment of FIG. 9a differs in the configuration of the nibs 88.

The nibs 88 are lanced sections of the main body portion 80 and extend outwardly from the main body portion. The nibs 88 in this embodiment offer a larger area to restrain the integrally molded seating member (not shown but comparable to the seating member 64 of FIG. 7). The larger area of the nibs 88 and their outwardly extending orientation act to prevent the seating member from shearing off under high compressive loadings.

The embodiment shown in FIGS. 10 to 13 has an anchor member 90 separable from the main body portion 92 of the anchorage device. The main body portion 92 of the anchorage device is formed with a crown portion 94 in which a bore 96 opens to permit the passage of a core 98 of a cable 100. The main body portion 92 is substantially tubular in shape and adapted to fit over a ferrule 102 on the casing of the cable. A seating end 104 is swaged upon the cable casing to secure the anchorage device to the cable.

Anchor member 90 is also substantially tubular in shape and is split longitudinally at 91 to permit it to be snapped over the main body portion 92. It is also possible to form the anchor member 90 of a drawn seamless tubular component of similar size which may be secured to the main body portion 92 by upsetting the end. The main body portion 92 is provided with a peripheral channel 106 to accommodate the anchor member 90 and to prevent its axial movement upon the main body portion 92. Anchor member 90 has prongs 108 diverging toward the seating end 104.

The anchorage device of this embodiment is also provided with a seating member, denoted generally as 109. The seating member 109 in turn comprises a back-up ring 110, preferably formed as part of the main body portion 92, and a resilient seating collar 111 in the form of an O-ring. The seating face 112 of the seating collar 111 is spaced from the prong ends 114 at a normal distance less than the thickness of the housing wall 116.

The principal advantage of this embodiment over the two embodiments discussed above is lower cost. In this embodiment the main body portion 92 is preferably formed of low carbon steel, the anchor member 90 being the only member formed of the more expensive high carbon steel. No cap is required to secure the main body portion to the cable casing because the softer low carbon steel permits the seating end 104 to be swaged easily. Further, resilient rings acceptable for use as the seating collar 111 are readily available and thus costs of integrally molding a resilient seating member are avoided.

I claim:
1. An anchorage device for securing a control cable conduit assembly in an opening in a housing wall, said control cable conduit assembly having a casing and an axially translatable core member therein, said anchorage device comprising
  (a) a substantially tubular main body portion adapted to receive said cable conduit assembly therein,
  (b) a crown portion at one end of said main body portion, said crown portion having an opening therein to permit the passage of said core element only,
  (c) at least a pair of inwardly compressible prongs diverging from the wall of said main body portion toward its other end opposite said crown portion, said prongs further having contact faces at their ends diagonal in the same direction with respect to the longitudinal axis of said main body portion and being spaced in relation to one another about said main body portion to prevent rotational movement of said main body portion with respect to said housing wall,
  (d) an annular seating member having a resilient elastomeric seating collar integrally molded to said other end, said seating collar having a seating face diagonal with respect to the longitudinal axis of said main body portion and in a plane substantially parallel to that of the contact faces of said prongs, the normal distance between said seating face and the ends of said prongs being less than the thickness of said housing wall such that there is provided a tight seal between said main body portion and said housing wall and the seating collar is drawn against the housing wall when rotational forces act on the main body portion, and
  (e) means for securing said anchorage device to said casing.

2. An anchorage device for securing a control cable conduit assembly in an opening in a housing wall, said control cable conduit assembly having a casing and an axially translatable core member therein, said anchorage device comprising
  (a) a substantially tubular high carbon steel main body portion adapted to receive said cable conduit assembly therein,
  (b) a crown portion at one end of said main body portion said crown portion having an opening therein to permit the passage of said core element only,
  (c) a pair of inwardly compressible high carbon steel prongs diverging from opposed portions of the wall of said main body portion toward its other end opposite said crown portion, said prongs further having contact faces at their ends diagonal to the longitudinal axis of said main body portion and substantially parallel to each other to prevent rotational movement of said main body portion with respect to said housing wall,
  (d) a resilient elastomeric annular seating member integrally molded to said other end and having a seating face diagonal with respect to the longitudinal axis of said main body portion and in a plane substantially parallel to that of the contact faces of said prongs, the normal distance between said seating face and the ends of said prongs being less than the thickness of said housing wall such that there is provided a tight seal between said main body portion and said housing wall and the seating collar is drawn against the housing wall when rotational faces act on the main body portion, and
  (e) a cap swaged about the other end of said anchorage device and securing it to said casing.

3. An anchorage device according to claim 2 wherein said seating member is of polyvinylchloride.

4. The anchorage device of claim 2 in combination with said housing wall having slot means therein adapted to receive a spine portion of said main body portion to restrain said anchorage device against rotation.

References Cited

UNITED STATES PATENTS

| 671,651 | 4/1901 | Mudd | 285—43 X |
| 2,244,976 | 6/1941 | Tinnerman | 151—54 X |
| 2,869,905 | 1/1959 | Brats | 285—162 X |
| 2,954,248 | 9/1960 | Brickman | 287—20 |
| 3,101,205 | 8/1963 | Benham | 287—20 X |
| 3,139,768 | 7/1964 | Biesecker | 287—20 X |
| 3,141,489 | 7/1964 | Rapata | 85—80 |
| 3,221,572 | 12/1965 | Swick | 287—20 X |

CARL W. TOMLIN, *Primary Examiner.*

THOMAS F. CALLAGHAN, *Examiner.*

T. A. LISLE, *Assistant Examiner.*